United States Patent
Jin

(10) Patent No.: US 7,923,870 B2
(45) Date of Patent: Apr. 12, 2011

(54) NONCONTACT POWER TRANSMISSION SYSTEM AND POWER TRANSMITTING DEVICE

(75) Inventor: Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 12/076,069

(22) Filed: Mar. 13, 2008

(65) Prior Publication Data

US 2008/0231120 A1    Sep. 25, 2008

(30) Foreign Application Priority Data

Mar. 20, 2007   (JP) ................... 2007-073256

(51) Int. Cl.
*H01H 9/54*    (2006.01)
(52) U.S. Cl. ...................................... 307/140
(58) Field of Classification Search .................. 307/140
See application file for complete search history.

(56) References Cited

U.S. PATENT DOCUMENTS

| | | | | |
|---|---|---|---|---|
| 5,572,478 A | * | 11/1996 | Sato et al. .................. | 365/226 |
| 5,898,578 A | * | 4/1999 | Tamura et al. ............... | 363/19 |
| 5,929,598 A | * | 7/1999 | Nakama et al. .............. | 320/108 |
| 6,707,291 B2 | * | 3/2004 | Goto et al. ................. | 324/207.16 |
| 7,310,245 B2 | * | 12/2007 | Ohbo ......................... | 363/21.02 |
| 2008/0197711 A1 | * | 8/2008 | Kato et al. .................. | 307/104 |

FOREIGN PATENT DOCUMENTS

| | | |
|---|---|---|
| JP | A-10-322247 | 12/1998 |
| JP | A-2000-166129 | 6/2000 |
| JP | A-2000-295796 | 10/2000 |
| JP | A-2002-101578 | 4/2002 |
| JP | A 2003-079076 | 3/2003 |
| JP | A 2003-189508 | 7/2003 |
| JP | A 2006-060909 | 3/2006 |
| JP | 2006-230032 | 8/2006 |
| JP | A 2006-288034 | 10/2006 |

* cited by examiner

*Primary Examiner* — Robert L. Deberadinis
(74) *Attorney, Agent, or Firm* — Oliff & Berridge, PLC

(57) ABSTRACT

A noncontact power transmission system having a power transmitting device including a primary coil and a power receiving device including a secondary coil, the primary coil and the secondary coil being electromagnetically coupled to each other and the power transmitting device configured to transmit electric power to the power receiving device, wherein the secondary coil contains a magnetic substance, the power transmitting device has a feeding section for feeding power to the primary coil and a self inductance detection section for detecting a change in the self inductance of the primary coil immediately after starting the feeding to the primary coil, wherein a feeding operation of the feeding section immediately after starting the feeding is determined based on a detection result of the self inductance detection section.

8 Claims, 4 Drawing Sheets

NONCONTACT POWER TRANSMISSION SYSTEM AND POWER TRANSMITTING DEVICE

The entire disclosure of Japanese Patent Application No. 2007-073256, filed Mar. 20, 2007 is expressly incorporated by reference herein.

BACKGROUND OF THE INVENTION

1. Field of the Invention

The present invention relates to a noncontact power transmission system that contactlessly transmits electric power from a power transmitting device on the primary side to a power receiving device on the secondary side using electromagnetic induction.

2. Description of the Related Art

A noncontact power transmission system of this type has conventionally been disclosed in, e.g., JP-A-2006-60909 (hereinafter referred as Patent Document 1).

The noncontact power transmission system described in Patent Document 1 verifies whether or not a power transmitting device and a power receiving device are regular, by means of mutual communication, prior to power transmission and, until completion of the verification, the power transmitting device does not start full-scale power transmission to the power receiving device.

In addition, another conventional noncontact power transmission system, for example, that performs such an operation as illustrated in FIG. 6 has been known.

As illustrated in FIG. 6, the power transmitting device side intermittently supplies electric power to a self primary coil during a predetermined time T1 and performs an operation corresponding to the presence/absence of a response from the power receiving device side. In other words, the power transmitting device stops power supply to the primary coil unless there is a request for authentication from the power receiving device side after lapse of the predetermined time T1. On the other hand, the power transmitting device performs an authentication operation if there is a request for authentication from the power receiving device side after lapse of the predetermined time T1 and, when the authentication is satisfied, starts a power transmitting operation to the power receiving device.

Referring next to a flowchart in FIG. 7, detailed description will be made on operations thereof.

The power transmitting device side starts drive of the primary coil (step S1), then performs detection of the authentication (step S2) and, if the detection fails, stops driving the primary coil (step S3). On the other hand, as described later, when the detection is succeeded, a predetermined authentication operation is performed (step S4).

The power receiving device side, when the self secondary coil and the primary coil of the power transmitting device are electromagnetically coupled together, receives electric power high enough to start (step S5). The receipt of power causes power-on reset (step S6) and the power receiving device starts an authentication operation between the power transmitting device and itself (step S7).

Upon the authentication operation, the power transmitting device side can detect the authentication, and thus performs a predetermined authentication operation (step S4). If it is determined by the authentication operation that power transmission to the power receiving device is allowed, the power transmitting device starts transmission of electric power to the power receiving device.

In a conventional noncontact power transmission system that performs such an operation as illustrated in FIGS. 6 and 7, the power transmitting device side needs to detect a request from the power receiving device side when intermittently supplying power to a self primary coil only during the predetermined time T1.

Accordingly, the power transmitting device needs to supply power to the primary coil during the predetermined time T1 until the power receiving device is ready to respond, and there is a problem of power consumption that increases on standby as the predetermined time T1 increases, which requires a solution thereto.

In view of the foregoing problems, it is an object of the present invention to provide a noncontact power transmission system that can reduce power consumption of a power transmitting device on standby by reducing time of feeding a primary coil in intermittently operating the power transmitting device.

SUMMARY OF THE INVENTION

To solve the foregoing problems and to attain the object of the present invention, each aspect of the invention has the following configuration:

According to a first aspect, a noncontact power transmission system has a power transmitting device including a primary coil and a power receiving device including a secondary coil, the primary coil and the secondary coil being electromagnetically coupled to each other and the power transmitting device configured to transmit electric power to the power receiving device, in which the secondary coil contains a magnetic substance, the power transmitting device has a feeding section for feeding power to the primary coil and a self inductance detection section for detecting a change in the self inductance of the primary coil immediately after starting the feeding to the primary coil, and a feeding operation of the feeding section immediately after starting the feeding is determined based on a detection result of the self inductance detection section.

In the first aspect of the present invention, a second aspect further includes a control section for controlling the feeding section so as to stop the feeding from the feeding section when a detection value detected by the self inductance detection section is at or below a predetermined value and to continue the feeding from the feeding section when a detection value detected by the self inductance detection section is at or above the predetermined value.

In the first or the second aspect of the present invention, a third aspect intermittently feeds electric power to the primary coil.

In the first to the third aspects of the present invention, a fourth aspect has a primary coil and a secondary coil formed from flat coils and, on one plane of the flat coil constituting the secondary coil, a magnetic sheet is provided so as to face.

In the fourth aspect of the present invention, the fifth aspect has a magnetic sheet formed from an amorphous magnetic substance.

In the first to fifth aspects of the present invention, the sixth aspect has the power receiving device installed in a mobile phone.

The present invention having such a configuration can shorten time of feeding a primary coil in intermittently operating a power transmitting device and can reduce power consumption in the power transmitting device on standby.

BRIEF DESCRIPTION OF THE DRAWINGS

FIG. 2A is a top view thereof and FIG. 2B is a side view thereof;

DETAILED DESCRIPTION OF THE PREFERRED EMBODIMENTS

Embodiments of the present invention will be more particularly described with reference to the accompanying drawings.

Prior to description of embodiments of the present invention, description will be made on a brief summary of the present invention and a basic concept thereof.

Figure 1:
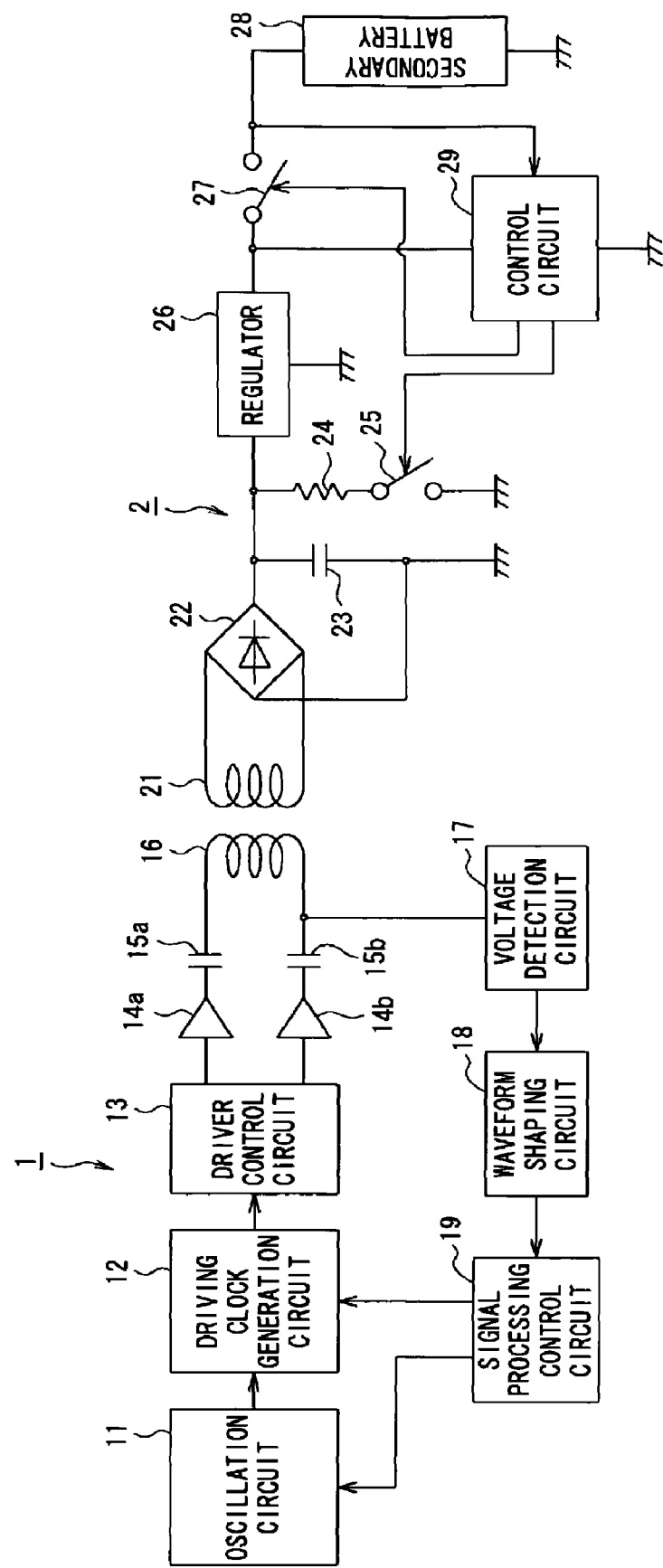
FIG. 1 is a block diagram illustrating a configuration of one embodiment according to the present invention.

A noncontact power transmission system according to the present invention is installed (applied), for example, in a mobile phone and, as illustrated in FIG. 1, and is adapted to contactlessly transmit electric power from a transmitting device 1 on the primary side to a power receiving device 2 on the secondary side, utilizing electromagnetic induction.

The present invention has focused attention on a fact that when a secondary coil 21 provided with a magnetic substance 31 on the power receiving device 2 side is in proximity to a primary coil 16 of the power transmitting device 1 when and immediately after starting feeding to the primary coil 16, a self inductance of the primary coil 16 changes more than when it is not in proximity, thereby changing an amplitude of a voltage generated at a terminal of the primary coil 16.

Figure 5:
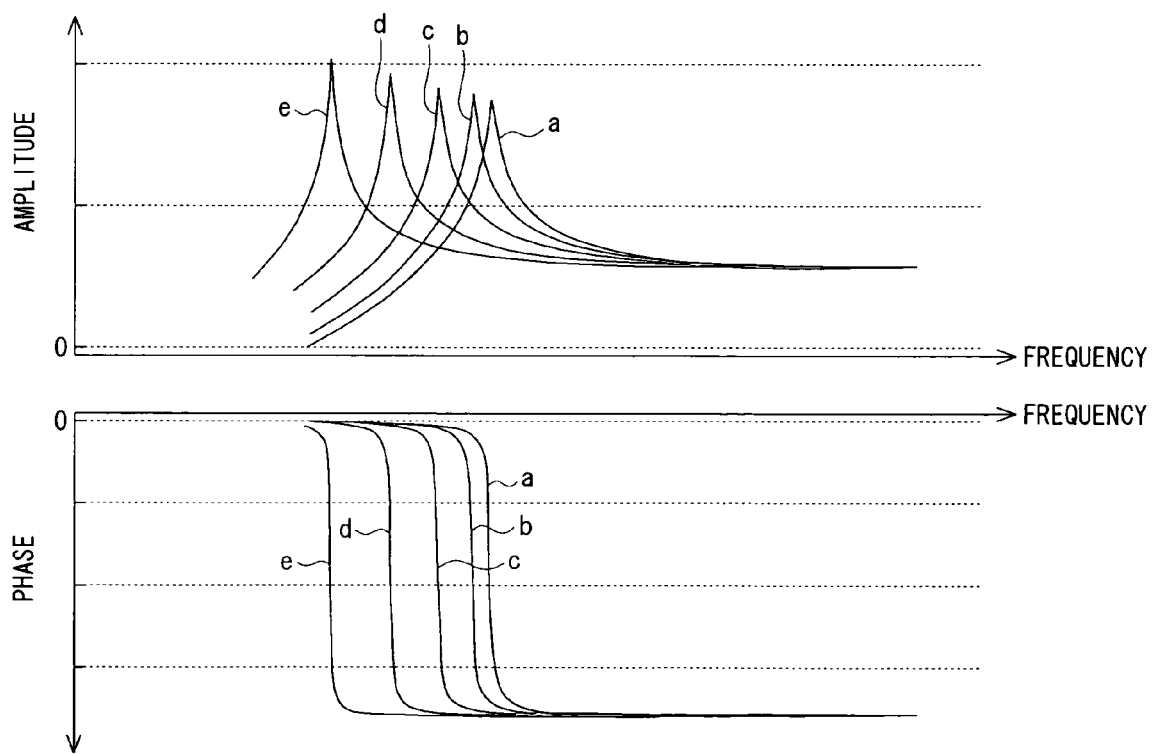
FIG. 5 is a view illustrating changing characteristics of amplitude and phase of a voltage on a primary coil end due to a change in self inductance of the primary coil.
Figure 6:
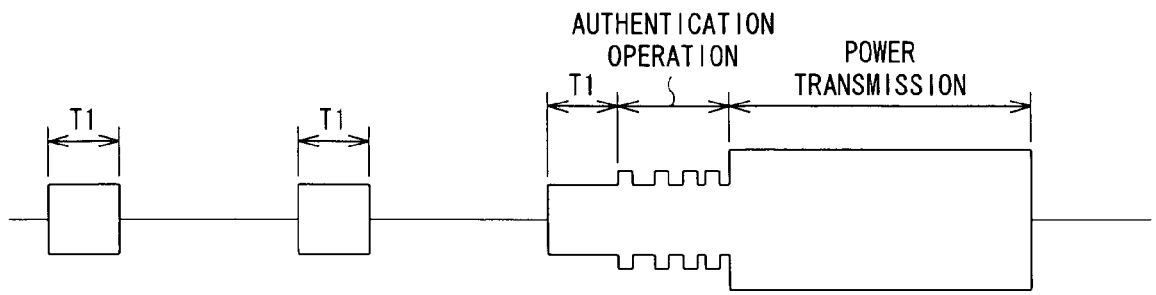
FIG. 6 is a view illustrating, on a time base, timings of each operation of a conventional device.
Figure 7:
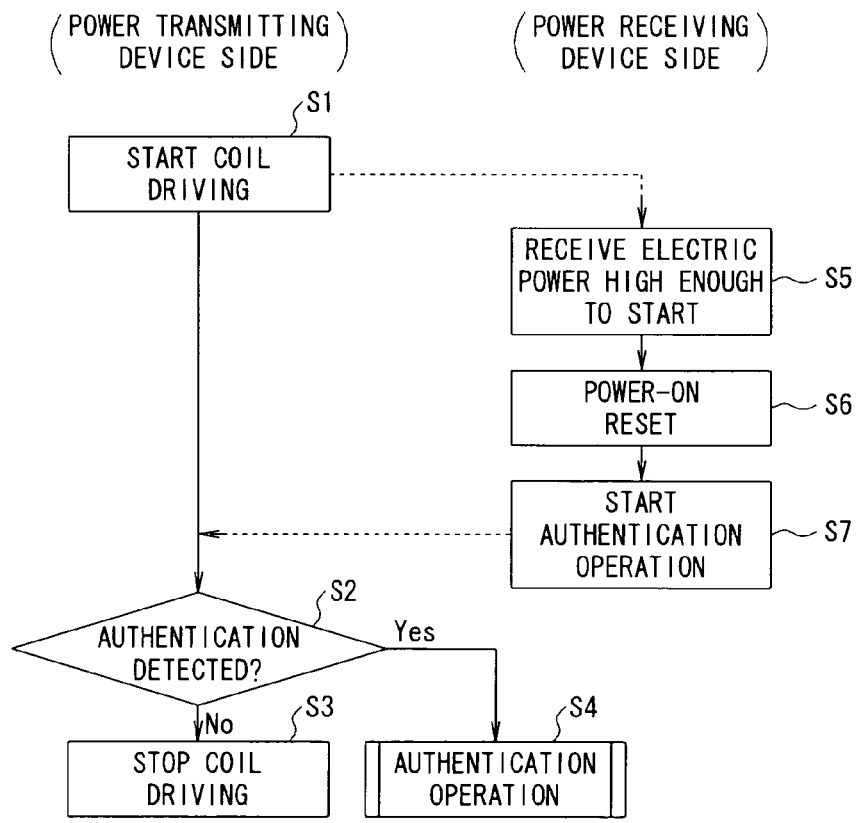
FIG. 7 is a flowchart illustrating an operational example of a conventional device.

Such a fact can be verified through an experiment illustrated in FIG. 5. In FIG. 5, a curve "a" indicates changes in amplitudes and phases of voltages at a primary coil 16 end with respect to frequencies when the close distance between the secondary coil 21 and the primary coil 16 is longest, that is, the self inductance of the primary coil 16 is smallest. Curves b, c, d and e are shifted to the left as the close distance between the coils becomes shorter in this order, that is, the self inductance of the primary coil 16 becomes higher in the order.

FIG. 5 indicates that when the self inductance of the primary coil 16 is changed by bringing the secondary coil 21 provided with the magnetic substance 31 closer to the primary coil 16, changing characteristics of voltages at the primary coil 16 end due to changes in the self inductance have large changes in amplitudes and small changes in phases.

In addition, FIG. 5 indicates that changing characteristics of amplitudes and phases of voltages at the primary coil 16 end due to changes in the self inductance of the primary coil 16 illustrated in FIG. 5 causes a change in resonance frequencies while maintaining Q values, to some extent, of a resonance circuit when viewed from the power transmitting device 1 side if a magnetic material with little loss in the magnetic substance 31 of the secondary coil 21 is used.

Accordingly, the power transmitting device 1 of the present invention detects a voltage at the primary coil 16 end at a frequency above or below a resonance frequency of a resonance circuit on the power transmitting device 1 side when the secondary coil 21 on the power receiving device 2 side is not in proximity. However, this should be a frequency at which phase sensitivity is low and a constant amplitude change is observable.

The present invention is based on such a concept and the power transmitting device 1 detects a change in the self inductance of the primary coil 16 immediately after starting power supply to the primary coil 16 and determines a feeding operation (feeding stop or continuance) immediately after feeding start based on the detection result.

Next, description will be made on detailed configurations of the embodiments.

The power transmitting device 1, as illustrated in FIG. 1, an oscillation circuit 11, a driving clock generation circuit 12, a driver control circuit 13, driver circuits 14a, 14b, capacitors 15a, 15b, a primary coil 16, a voltage detection circuit 17, a waveform shaping circuit 18 and a signal processing control circuit 19.

The oscillation circuit 11 is a circuit for generating a pulse, for example, having a desired frequency. The oscillation of the oscillation circuit 11 are controlled by a signal processing control circuit 19.

The driving clock generation circuit 12 is a circuit for generating a driving clock having a predetermined frequency based on an output of the oscillation circuit 11 and the frequency is controlled by the signal processing control circuit 19.

The driver control circuit 13 generates a signal for operating the driver circuits 14a, 14b based on a driving clock generated by the driving clock generating circuit 12 and outputs the generated signal to the driver circuits 14a, 14b.

Each of the driver circuits 14a, 14b is a circuit for driving a series resonance circuit having the capacitors 15a, 15b and the primary coil 16.

The primary coil 16 is electromagnetically coupled with the secondary coil 21 on the power receiving device 2 side, so that electric power can be transmitted from the primary coil 16 side to the secondary coil 21 side by electromagnetic induction. In other words, a transformer is provided to physically separate the primary coil 16 from the secondary coil 21.

The voltage detection circuit 17 is a circuit for detecting a voltage (induced voltage) generated at the primary coil 16 end. The waveform shaping circuit 18 is a circuit for shaping a waveform of a detected voltage detected by the voltage detection circuit 17.

The signal processing control circuit 19 is a circuit that determines, based on a detected voltage detected by a voltage detection circuit 17 and subjected to waveform shaping by the waveform shaping circuit 18, an amplitude value and a pulse width of the detected voltage and that, based on the determined value, controls predetermined feeding by controlling each section as described later.

The power receiving device 2 is a device that receives electric power transmitted from the power transmitting device 1 and supplies the transmitted power to a secondary battery as a load.

Accordingly, as illustrated in FIG. 1, the power receiving device 2 includes a secondary coil 21, a rectification circuit 22, a smoothing capacitor 23, a resistor 24, a switch 25, a regulator 26, a switch 27, a secondary battery (a load) 28 and a control circuit 29.

The secondary coil 21 is electromagnetically coupled with the primary coil 16 on the power transmitting device 1 side to induce a voltage. The primary coil 16 and the secondary coil 21 produce electromagnetic induction when their transmitting surfaces are faced and brought closer to each other.

Figure 2A:
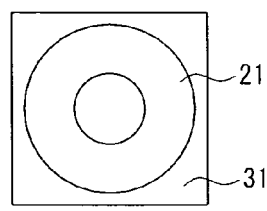
FIG. 2A and FIG. 2B are the views illustrating a configuration of a secondary coil and a magnetic substance.
Figure 2B:
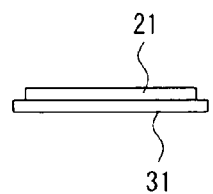

The secondary coil 21, as illustrated in FIG. 2A and FIG. 2B, is provided with a magnetic sheet or the like as a magnetic substance 31 on one plane side, and requirements of the magnetic substance are as follows:

(1) Easily incorporated in the power receiving device 2 side.
(2) High permeability in several hundreds kHz, for example, the permeability of 100 or higher.
(3) Little iron loss.
(4) The self inductance of the primary coil 16 on the power transmitting device 1 side can reasonably be changed. Specifically, in the case of the primary coil 16 and the secondary coil 21 formed from flat coil, the self inductance of the primary coil 16 is to be easily changed when an interval (a distance) therebetween is 5 mm or less.

Preferably, the material of the magnetic substance 31 satisfying such conditions is a sheet-like amorphous magnetic substance made of an amorphous material. Where the magnetic substance 31 is formed from the sheet-like amorphous magnetic substance, the area thereof is larger than that of the flat face of the secondary coil 21 (refer to FIG. 2A and FIG. 2B) and the thickness thereof is, for example, 0.1 mm or less.

The rectification circuit 22 rectifies an induced voltage of the secondary coil 21. The smoothing capacitor 23 smoothes an output voltage from the rectification circuit 22. The smoothed voltage is changed by the resistor 24 and the switch 25.

The regulator 26, based on the smoothed voltage, generates a desired stabilized voltage and the generated voltage is supplied to a secondary battery 28 through the switch 27 and is supplied directly to a control circuit 29.

The control circuit 29 operates on an output voltage from the regulator 26, and when requesting a power receiving operation to the power transmitting device 1, it turns on and off the switch 25 for an authentication operation prior to the request, and thus performs load modulation to transmit predetermined data to the power transmitting device 1 side.

Moreover, the control circuit 29, when the power transmitting device 1 performs power transmission, turns on the switch 27 to start charging of the secondary battery 28 and, during the charging period, monitors a charging voltage. Further, the control circuit, after completion of the charging, turns off the switch 27 and on-off controls the switch 25 to notify the power transmitting device 1 side of the completion of the charging.

Referring now to FIGS. 1 to 4, description will be made on an operational example of an embodiment formed from such a configuration.

Figure 3A:
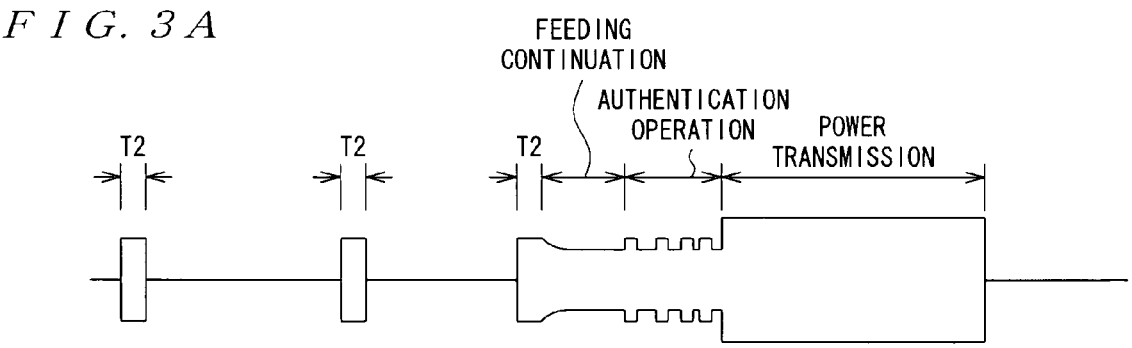
FIG. 3A and FIG. 3B are the views illustrating, on a time base, timings of each operation of one embodiment according to the present invention.
Figure 3B:
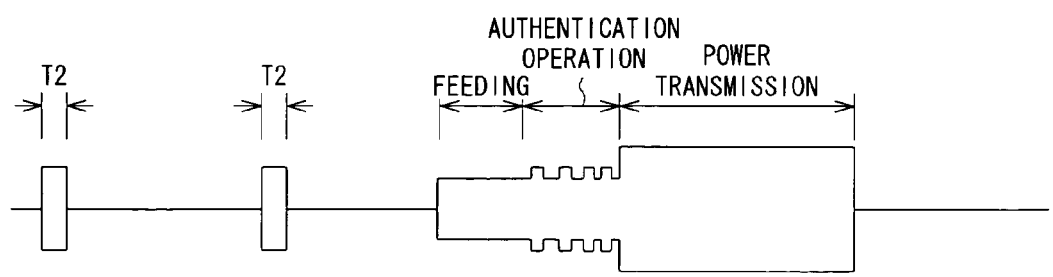

The power transmitting device 1, as illustrated in FIG. 3A and FIG. 3B, feeding is intermittently started to the self primary coil 16. Upon the feeding start, the self inductance value of the primary coil 16 varies with the presence of the secondary coil 21 on the power receiving device 2 side in proximity to the primary coil 16. The magnitude of the self inductance value is grasped by detecting a voltage at the primary coil 16 end.

Accordingly, the power transmitting device 1 stops the feeding operation at a predetermined time T2 when the detected voltage is at or below a predetermined value. On the other hand, when the detected voltage is at or above the predetermined value, the power transmitting device 1 continues the feeding operation even after a lapse of the predetermined time T2. Thereafter, upon request for authentication from the power receiving device 2, the power transmitting device 1 performs an authentication operation and, when the authentication is satisfied, starts an original power transmitting operation to the power receiving device 2.

FIG. 3A illustrates a state where the power transmitting device 1 is under an intermittent operation and will shift to an original feeding operation with intermittent operation. On the other hand, FIG. 3B illustrates a state where the power transmitting device 1 is under an intermittent operation, however, will shift to the original feeding operation without the intermittent operation.

Figure 4:
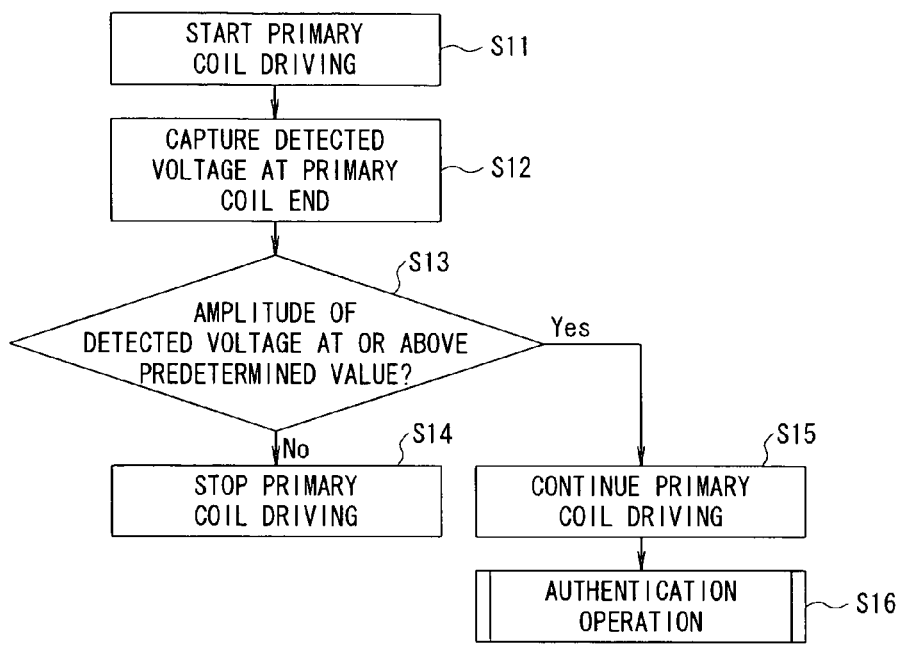
FIG. 4 is a flowchart illustrating an operational example of a power transmitting device.

Next, referring to a flowchart in FIG. 4, description will be made on details of an operational example.

The power transmitting device 1 starts driving of the primary coil 16 (step S1) and, upon the driving, the signal processing control circuit 19 captures a voltage at the primary coil 16 end detected by the voltage detection circuit 17 (step S12).

Next, the power transmitting device determines an amplitude of the captured detected voltage and judges whether or not the determined amplitude is at or above a predetermined value (step S13). After the judgment, when the amplitude is not at or above the predetermined value (No), that is, the secondary coil 21 is not in proximity to the primary coil 16 or the self inductance does not increase, the power transmitting device 1 stops driving of the primary coil 16 (step S14).

On the other hand, when an amplitude of the detected voltage is at or above the predetermined value (Yes), that is, when the secondary coil 21 is in proximity to the primary coil 16 and the self inductance increases, the power transmitting device 1 continues driving of the primary coil 16 (step S15).

This causes the power receiving device 2 to start an authentication operation with the power transmitting device 1 upon receiving electric power high enough to start. When the authentication operation starts, the power transmitting device 1 performs a predetermined authentication operation (step S16). If it is determined by the authentication operation that power transmission to the power receiving device 2 is allowed, the power transmitting device 1 starts transmission of electric power to the power receiving device 2.

As described above, this embodiment provides shortening of time of feeding the primary coil 16 because the intermittent operation of the power transmitting device 1 does not need to wait a response from the power receiving device 2, and attains reduction in power consumption of the power transmitting device 1 on standby.

What is claimed is:

1. A noncontact power transmission device comprising:
   a power transmitting device including a primary coil; and
   a power receiving device including a secondary coil, the primary coil and the secondary coil being electromagnetically coupled to each other and the power transmitting device being configured to transmit electric power to the power receiving device,
   the power transmitting device having:
   a feeding section that feeds power to the primary coil; and
   a detection section that detects a change of self inductance of the primary coil,
   the power transmission device being configured to stop the feeding section after a predetermined time elapsed from start of an operation of the feeding section during an intermittent operation if the detection section detects that the secondary coil is not in proximity of the primary coil; and
   the power transmitting device being configured to continue the operation of the feeding section after the predetermined time elapsed during the intermittent operation if the detection section detects that the secondary coil is in proximity of the primary coil.

2. The noncontact power transmission system according to claim 1, the power transmission device further having a control section that controls the feeding section so as to stop the operation of the feeding section when a detection value detected by the detection section is below a predetermined value and to continue the operation of the feeding section when a detection value detected by the detection section is at or above the predetermined value.

3. The noncontact power transmission system according to claim 1, the feeding section intermittently feeding electric power to the primary coil.

4. The noncontact power transmission system according to claim 1, the primary coil and the secondary coil being flat coils, and on one plane of the secondary coil, a magnetic sheet being provided.

5. The noncontact power transmission system according to claim 4, the magnetic sheet formed by an amorphous magnetic substance.

6. The noncontact power transmission system according to claim 1, the power receiving device being installed in a mobile phone.

7. A power transmitting device comprising:

a feeding circuit that feeds power to a primary coil; and a detection circuit that detects a change of self inductance of the primary coil after the feeding; and the power transmitting device being configured to stop the feeding circuit after a predetermined time elapsed from start of an operation of the feeding circuit during an intermittent operation if the detection section detects that a secondary coil is not in proximity of the primary coil, the power transmitting device being configured to continue the operation of the feeding circuit after the predetermined time elapsed during the intermittent operation if the detection section detects that the secondary coil is in proximity of the primary coil.

8. A noncontact power transmission system comprising the power transmission device according to claim 7.

* * * * *